Patented July 14, 1936

2,047,315

UNITED STATES PATENT OFFICE 2,047,315

PYRAZOLONE AZO DYESTUFFS

George Holland Ellis, Spondon, near Derby, England, assignor to Celanese Corporation of America, a corporation of Delaware No Drawing. Application May 5, 1931, Serial No. 535,296. In Great Britain January 9, 1930

3 Claims. (Cl. 260—44.6)

This application is a continuation in part of U. S. application S. No. 500,428, filed 5th December, 1930, (now abandoned) and relates to a new class of azo dyes, and to processes for the production of the same.

The new dyes of the invention contain a pyrazolone residue linked through at least one azo group to an aromatic residue containing an auxochromic group in the para position to the azo group. The pyrazolone nucleus is preferably a 1-phenyl-3-methyl-5-pyrazolone residue. The auxochrome group in the para position is preferably an amino or substituted amino group, for example a dimethylamino or acetylamino group, but may be a hydroxy group. The dyestuffs of the invention exhibit a remarkable fastness to light and to the action of reducing agents such as stannous chloride, which are commonly employed in the production of reduction discharges. For this reason the dyestuffs are of great utility in the production of illuminated or colored discharge effects. The dyestuffs, and particularly the unsulphonated members of the class have a good affinity for cellulose acetate and other organic derivatives of cellulose. The term organic derivative of cellulose is intended to connote ethers and organic esters of cellulose, e. g. ethyl, methyl and benzyl cellulose and cellulose formate, propionate and butyrate.

As examples of the new dyestuffs the following may be instanced:—

| No. | Compound | Color |
|---|---|---|
| 1 | p - hydroxy - benzene - azo - 1 - phenyl - 3 - methyl-5-pyrazolone. | Golden yellow. |
| 2 | p - amino - benzene - azo - 1 - phenyl - 3 - methyl-5-pyrazolone. | Orange. |
| 3 | p-dimethylamino - benzene - azo - 1 - phenyl-3-methyl-5-pyrazolone. | Red. |
| 4 | p - acetyl - amino - benzene - azo - 1 - phenyl-3-methyl-5-pyrazolone. | Golden orange. |
| 5 | 4' - amino - diphenyl - methane - 4 - azo - 1 - phenyl-3-methyl-5-pyrazolone. | Golden yellow. |
| 6 | 4' - amino - diphenyl - 4 - azo - 1 - phenyl - 3 - methyl-5-pyrazolone. | Golden orange. |
| 7 | 4 - dimethylamino - 2 - methoxy - benzene - azo-1-phenyl-3-methyl-5-pyrazolone. | Red. |

The dyestuffs may be produced by any suitable means, for example by coupling a pyrazolone with a diazo compound containing in the para position to the diazo group an amino, substituted amino, or hydroxy group, or a group readily convertible thereinto, and if necessary converting said group.

The diazo compound with which the pyrazolone is coupled may already contain the desired group in the para position to the diazo group. For example p-hydroxy-benzene-azo-1-phenyl-3-methyl-5-pyrazolone may be produced directly by diazotizing p-amino-phenol and coupling with 1-phenyl-3-methyl-5-pyrazolone. On the other hand the desired para substituent may be obtained by a subsequent reaction effected upon the compound resulting from coupling the pyrazolone with a diazo compound containing in the para position a suitable substituent, that is one which may readily be converted into the desired substituent. For example p-amino-benzene-azo-1-phenyl-3-methyl-5-pyrazolone, 4'-amino-diphenyl-methane-4-azo-1-phenyl-3-methyl-5-pyrazolone, and 4'-amino-diphenyl-4-azo-1-phenyl-3-methyl-5-pyrazolone may be made by diazotizing p-amino-acetanilide, acetyl-diamino-diphenyl-methane, and acetyl benzidine respectively, coupling with the pyrazolone and hydrolyzing the resulting product. Again, p-amino-benzene-azo-1-phenyl-3-methyl-5-pyrazolone may be produced by reducing one of the nitro groups in p-dinitro-benzene, diazotizing, coupling with 1-phenyl-3-methyl-5-pyrazolone and thereafter reducing the remaining nitro group, or, of course, the starting product may be p-nitraniline. Again, 4-dimethyl-amino-2-methoxy-benzene-azo-1-phenyl-3-methyl-5-pyrazolone may be produced by diazotizing p-nitro-ortho-anisidine, coupling with 1-phenyl-3-methyl-5-pyrazolone, reducing the nitro group, and methylating the resulting amino group. Similarly, 4'-amino-diphenyl-methane-4-azo-1-phenyl-3-methyl-5-pyrazolone and 4'-amino-diphenyl-4-azo-1-phenyl-3-methyl-5-pyrazolone may be produced by diazotizing 4-amino-4'-nitro-diphenyl-methane and 4-amino-4'-nitro-diphenyl respectively, coupling with the pyrazolone and reducing the nitro group.

The diazo compounds employed in the invention may be produced by any desired method, for example acetylamino - azo - diphenyl - methane, which may be employed in the production of 4'- amino - diphenyl-4-azo-1-phenyl-3-methyl-5-pyrazolone as described above, may be obtained by treating p-p'-dinitro-diphenyl-methane so as to reduce one of the nitro groups, acetylating the resulting amino group, reducing the second nitro group and diazotizing.

The diazotization of the appropriate amino compound may be effected by any suitable means. Naturally the particular method of diazotization employed will depend upon the nature of the amino compound. Thus, with the exception of the dinitro-amines it is convenient to dissolve the amino component in the requisite quantity of dilute hydrochloric acid and effect the diazotization by the addition of sodium nitrite in the usual manner. In the case of the dinitro-amines a convenient means of diazotization is to treat the compound with nitrosyl sulphuric acid diluted with ice.

The following example illustrates the production of p-dimethylamino-benzene-azo-1-phenyl-3-methyl-5-pyrazolone:—

*Example*

450 grams of dimethyl aniline are mixed with 1400 cc. of 28% hydrochloric acid and the mixture poured on to a mixture of 700 cc. of hydrochloric acid and 1 kg. of ice contained in a ten litre tub. The mixture is cooled to −10° C. with an external freezing mixture. A solution of 300 grams of sodium nitrite in two litres of water is slowly run in with mechanical stirring, keeping the temperature below −5° C.

The nitrozation liquors are diluted with 5 litres of warm water, the temperature rising to 20–30° C. A further 1500 cc. of 28% hydrochloric acid are added and then 1065 grams of zinc dust are slowly added. The temperature is maintained below 45° C. by the addition of ice from time to time. When the liquor becomes colorless the addition of zinc is discontinued.

The zinc is removed by neutralizing hydrochloric acid with 3 litres of 30% caustic soda and completing the precipitation of the zinc by the addition of about 1.35 kgs. of soda ash. The precipitated zinc carbonate is filtered off and washed. The liquor is immediately used for diazotization.

A litre of 28% hydrochloric acid is added to the liquor and the temperature reduced to −5° C. by the addition of 5 kgs. of ice. A solution of 272 grams sodium nitrite in 2 litres of water is then gradually added until the amine is completely diazotized, and the solution shows a slight excess of nitrous acid.

635 grams of 1-phenyl-3-methyl-5-pyrazolone are then dissolved in 3 litres of water containing 150 grams of caustic soda. The solution is poured on to 4 kgs. of ice in a 30 litre tub. The diazo solution is run in fairly quickly, the liquor being maintained alkaline by the addition from time to time of soda ash (about 0.5 kgs. in all). The whole is allowed to stand for a short time, after which the precipitated dye is filtered off and washed. It may then be transferred to a ball-mill, and finally ground and worked up into paste or other suitable form for application to the material to be dyed.

The new dyestuffs of the invention may be applied by any suitable means to the coloration of cellulose acetate artificial silk and other materials. In the coloration of cellulose acetate or other organic derivatives of cellulose the coloring agent may for example be advantageously applied in the form of a paste or composition which may contain solubilizing agents for the dyestuff and/or swelling agents for the cellulose derivative. The dyestuffs may be applied by any suitable method of dyeing, printing, stencilling, etc.

What I claim and desire to secure by Letters Patent is:—

1. Azo dyestuffs of the general formula X—N=N—R—Y in which X is the residue of a pyrazolone coupling component, R is an aromatic radicle and Y is in the para position to the azo group and is a dimethylamino group.

2. Monoazo dyestuffs of the general formula X—N=N—R—Y in which X is the residue of a pyrazolone coupling component, R is a radicle of the benzene series and Y is in the para position to the azo group and is a dimethylamino group.

3. As a dyestuff, p-dimethylamino-benzene-azo-1-phenyl-3-methyl-5-pyrazolone.

GEORGE HOLLAND ELLIS.